(12) United States Patent
Takatori et al.

(10) Patent No.: US 8,827,491 B2
(45) Date of Patent: Sep. 9, 2014

(54) LIGHTING DEVICE

(75) Inventors: Hiroshi Takatori, Saitama (JP); Akinobu Seki, Saitama (JP); Noriyuki Kawahara, Saitama (JP)

(73) Assignee: Enplas Corporation, Kawaguchi (JP)

( * ) Notice: Subject to any disclaimer, the term of this patent is extended or adjusted under 35 U.S.C. 154(b) by 60 days.

(21) Appl. No.: 13/809,744

(22) PCT Filed: Jul. 13, 2011

(86) PCT No.: PCT/JP2011/004011
§ 371 (c)(1),
(2), (4) Date: Jan. 11, 2013

(87) PCT Pub. No.: WO2012/008154
PCT Pub. Date: Jan. 19, 2012

(65) Prior Publication Data
US 2013/0114258 A1    May 9, 2013

(30) Foreign Application Priority Data
Jul. 14, 2010  (JP) .................... 2010-159852

(51) Int. Cl.
| *F21V 7/00*  | (2006.01) |
| *F21V 5/04*  | (2006.01) |
| *G02B 3/08*  | (2006.01) |
| *F21S 2/00*  | (2006.01) |
| *F21Y 101/02* | (2006.01) |

(52) U.S. Cl.
CPC ............... *F21V 7/0083* (2013.01); *F21V 5/04* (2013.01); *G02B 3/08* (2013.01); *F21S 2/005* (2013.01); *F21V 7/0091* (2013.01); *F21Y 2101/02* (2013.01)
USPC ..................... 362/247; 362/296.01

(58) Field of Classification Search
CPC ................................................ F21V 7/0083
USPC .......................... 362/247, 249.02, 296.01
See application file for complete search history.

(56) References Cited

U.S. PATENT DOCUMENTS

| 2003/0156410 A1* | 8/2003 | Ter-Hovhannisian ........ 362/241 |
| 2006/0012993 A1* | 1/2006 | Ohkawa ........................ 362/240 |
| 2006/0291205 A1* | 12/2006 | Jeon ............................ 362/241 |
| 2010/0020264 A1 | 1/2010 | Ohkawa |

FOREIGN PATENT DOCUMENTS

| JP | 2007-005218 A | 1/2007 |
| JP | 2009-289506 A | 12/2009 |
| JP | 2010-028043 A | 2/2010 |
| JP | 2010-146986 A | 7/2010 |
| JP | 2010-152282 A | 7/2010 |
| JP | 2010-153402 A | 7/2010 |

\* cited by examiner

*Primary Examiner* — Evan Dzierzynski
(74) *Attorney, Agent, or Firm* — Washida IP Group, LLC

(57) ABSTRACT

A lighting device preventing an illumination variation on a surface to be irradiated. The lighting device has a first light emitting surface section (102*a*) which is a surface formed by rotating a bus with a central axis as a rotation axis in a first angle area ($-\theta 1 \leq \theta \leq \theta 1$) of an angle ($\theta$) relative to a cross section of the bus which is an intersection line with the cross section perpendicular to a surface (801*a*) to be irradiated and including the central axis of a lighting lens (100), a second light emitting surface section (102*b*) formed in a second angle area ($\theta 1 \leq \theta \leq 180°$ and $-180° \leq \theta \leq -\theta 1$) of the angle ($\theta$) so that a light flux emitted toward the surface (801*a*) increases as compared with the case where the first light emitting surface section (102*a*) is formed in a whole-angle area ($0° \leq \theta < 360°$) on the light emitting surface section (102), a third light emitting surface section (102*c*) formed by the step between the first light emitting surface section (102*a*) and the second light emitting surface section (102*b*).

7 Claims, 19 Drawing Sheets

| MEASUREMENT POINT \ AXIS | X | Y | Z |
|---|---|---|---|
| a | 0.000 | 0.000 | 0.000 |
| b | -1.356 | 0.086 | 0.486 |
| c | -2.041 | 0.129 | 0.667 |
| d | -2.808 | 0.178 | 7.230 |
| e | -2.801 | 0.177 | 200.000 |

FIG.5

| MEASUREMENT POINT \ AXIS | X | Y | Z |
|---|---|---|---|
| a | 0.000 | 0.000 | 0.000 |
| b | -1.356 | 0.086 | 0.486 |
| c | -2.041 | 0.129 | 0.667 |
| d | -2.798 | 0.177 | 7.233 |
| e | -2.335 | 0.148 | 200.000 |

FIG.6

| MEASUREMENT POINT / AXIS | X | Y | Z |
|---|---|---|---|
| a | 0.000 | 0.000 | 0.000 |
| b | -1.356 | 0.086 | 0.486 |
| c | -2.041 | 0.129 | 0.667 |
| d | -2.905 | 0.184 | 8.165 |
| e' | -36.864 | -37.954 | 200.000 |

FIG.7

|  |  | a | b | c | d |
|---|---|---|---|---|---|
| CASE 1 | NO LIGHTING LENS | 3240 | 251 | 175 | 133 |
| CASE 2 | CONVENTIONAL | 351 | 543 | 1412 | 139 |
| CASE 3 | EMBODIMENT (ILLUMINATED SURFACE 801a ON 102a SIDE) | 447 | 556 | 1166 | 190 |
|  | EMBODIMENT (ILLUMINATED SURFACE 801b ON 102b SIDE) | 511 | 417 | 965 | 196 |

FIG.13

| X AXIS / Z AXIS | 0 | 30 | 60 | 90 | 120 | 150 |
|---|---|---|---|---|---|---|
| 330 | 100% | 100% | 103% | 105% | 102% | 102% |
| 255 | 99% | 100% | 102% | 101% | 101% | 103% |
| 170 | 101% | 101% | 102% | 106% | 104% | 103% |
| 85 | 106% | 105% | 108% | 111% | 112% | 110% |
| 43 | 112% | 120% | 126% | 129% | 123% | 117% |
| 10 | 170% | 169% | 157% | 142% | 129% | 122% |

FIG.18

| Z AXIS \ X AXIS | 0 | 30 | 60 | 90 | 120 | 150 |
|---|---|---|---|---|---|---|
| 330 | 95% | 99% | 101% | 99% | 101% | 107% |
| 255 | 97% | 100% | 100% | 100% | 103% | 105% |
| 170 | 102% | 105% | 106% | 105% | 106% | 105% |
| 85 | 101% | 106% | 109% | 111% | 111% | 109% |
| 43 | 110% | 117% | 124% | 124% | 118% | 114% |
| 10 | 147% | 139% | 146% | 129% | 123% | 120% |

LIGHTING DEVICE

TECHNICAL FIELD

The present invention relates to a lighting device that controls light distribution characteristics of light emitted from a light emitting element.

BACKGROUND ART

In the past, a light-emitting device for spotlight illuminating a specific region by emitting light in a specific direction has been used for applications of supplementary lighting, ceiling lighting, or showcase lighting. Recently, a white light emitting diode (white LED) has been used as a light source of a lighting device for spotlight.

Since the white light emitting diode is a semiconductor element with a small size having high power efficiency and emitting light of a bright color, the white light emitting diode has features that it is in no danger of blowout, initial driving characteristics are superior, it is resistant to vibration or repetitive turning-on/off, and the like.

Most of the present white light emitting diodes use fluorescent substance, and such a type of white light emitting diode is generally called bluish yellow pseudo white light emitting diode.

As a planar light source unit for a display, a technique of controlling light distribution characteristics of light emitted from a light emitting diode using a cylinder-like lighting lens was known (for example, see PTL 1). However, when the lighting lens described in Patent Document 1 is used, there is a problem in that it is difficult to handle it due to its heaviness and a problem in that a mold is expensive due to its large size, thereby raising production cost thereof.

To solve these problems, a technique of controlling light distribution characteristics of light emitted from a light emitting diode using plural lighting lenses symmetric about the optical axis of the light emitting diode was known (for example, see PTL 2). In Patent Document 2, plural lighting lenses are arranged on the emission side of the light emitting diode and light emitted from the light emitting diode is concentrated on an illuminated surface side.

FIG. 1 is a diagram illustrating lighting device 1 using lighting lens 10 formed to be symmetric about the optical axis of a light emitting diode in Patent Document 2.

As shown in FIG. 1, lighting device 1 includes rectangular illuminated surface part 11 having illuminated surface 11a and opposing illuminated surface 11b opposing each other and having figures or characters of a signboard described thereon. In lighting device 1, light emitted from a light emitting diode not shown is incident on lighting lens 10, is controlled in its light distribution characteristics by lighting lens 10, and is emitted to illuminated surface part 11.

CITATION LIST

Patent Literature

PTL 1
Patent Document 1: Japanese Patent Application Laid-Open No. 2009-289506

PTL 2
Patent Document 2: Japanese Patent Application Laid-Open No. 2007-5218

SUMMARY OF INVENTION

Technical Problem

However, in PTL 2, the light distribution needs to be narrowed to cause light emitted from the light emitting diode to satisfactorily reach the entire illuminated surface, particularly, a position separated apart from the light emitting diode, and there is thus a problem in that irregularity in illuminance occurs in the vicinity of the middle of neighboring light emitting diodes. That is, irregularity in illuminance occurs in the region of r1 in FIG. 1.

An object of the invention is to provide a lighting device which can suppress occurrence of irregularity in illuminance in an illuminated surface located at a predetermined position by arranging plural light flux controlling members, which distribute and emit incident light to the illuminated surface with good balance, in a predetermined direction in combination with light emitting elements.

Solution To Problem

According to an aspect of the invention, there is provided a lighting device including: a plurality of light emitting units that each include a light emitting element and a light flux controlling member that controls a traveling direction of light emitted from the light emitting element, and that are arranged at predetermined intervals; an illuminated surface part that is illuminated by light emitted from the light flux controlling member; and an opposing illuminated surface part that is disposed to oppose the illuminated surface part, wherein: each of the plurality of light emitting units has the light flux controlling member and the light emitting element arranged therein so that a central axis of the light flux controlling member matches the optical axis of the light emitting element; the illuminated surface part is disposed so that an incident angle of light, which is emitted with a larger angle about the optical axis out of light emitted from the light flux controlling member, on the illuminated surface part becomes smaller; the light flux controlling member includes an incidence part on which light emitted from the light emitting element is incident, a total reflection surface part that totally reflects a part of light incident from the incidence part, and an emission surface part that controls light reflected by the total reflection surface part and light directly arriving from the incidence part into light having desired light distribution characteristics and that emits the controlled light; the incidence part includes a first incidence surface part that is formed on an inner top surface of a concave part formed by making a bottom surface of the light flux controlling member opposing the light emitting element concave inward and a second incidence surface part that is located between an outer rim of the first incidence surface part and an opening edge of the concave part; the total reflection surface part is formed between the bottom surface and the emission surface part so as to surround the optical axis and totally reflects light mainly incident from the second incidence surface part of the incidence part toward the emission surface part; and the emission surface part includes a first emission surface part that is a surface formed by rotating a generating line, which is an intersection line with a cross-section perpendicular to the illuminated surface part and including the central axis, about the central axis in a first angle region ($-\theta_1 \le \theta \le \theta_1$) of an angle $\theta$ of the generating line with respect to the cross-section, a second emission surface part that is formed in a second angle region ($\theta1 \leq \theta \leq 180°$ and $-180° \leq \theta \leq -\theta1$) of the angle $\theta$ so that a light flux emitted to one of the illuminated surface part and the opposing illuminated surface part close to the first emission surface part is greater than that in a case where the first emission surface part is formed in the entire angle region ($0° \leq \theta < 360°$) of the angle $\theta$ in the emission surface part, and a third emission surface part that is formed by a difference in level between the first emission surface part and the second emission surface part.

Advantageous Effects Of Invention

According to the invention, it is possible to suppress occurrence of irregularity in illuminance in an illuminated surface located at a predetermined position by arranging plural light flux controlling members, which distribute and emit incident light to the illuminated surface with good balance, in a predetermined direction in combination with light emitting elements.

BRIEF DESCRIPTION OF DRAWINGS

FIG. 5 is a diagram illustrating positions of the path of light at measurement points shown in FIG. 4 when the conventional lighting lens is used;

FIG. 6 is a diagram illustrating positions of the path of light at measurement points shown in FIG. 4 when the light flux controlling member according to the embodiment of the invention is used and a first emission surface part is disposed on the +side of the Y axis;

FIG. 7 is a diagram illustrating positions of the path of light at measurement points shown in FIG. 4 when the light flux controlling member according to the embodiment of the invention is used and a second emission surface part is disposed on the +side of the Y axis;

FIG. 13 is a diagram illustrating the measurement results at the measurement points of illuminance in the illuminated surface and the opposing illuminated surface of the lighting device according to the embodiment of the invention;

FIG. 18 is a diagram illustrating an illuminance increase rate in the illuminated surface on the first emission surface part side in the embodiment of the invention, compared with a case where a conventional black holder is used; and FIG. 19 is a diagram illustrating an illuminance increase rate in the opposing illuminated surface on the second emission surface part side in the embodiment of the invention, compared with a case where the conventional black holder is used.

DESCRIPTION OF EMBODIMENTS

Hereinafter, an embodiment of the invention will be described in detail with reference to the accompanying drawings.

(Embodiment)

Configuration of Light Flux Controlling Member

Figure 2:
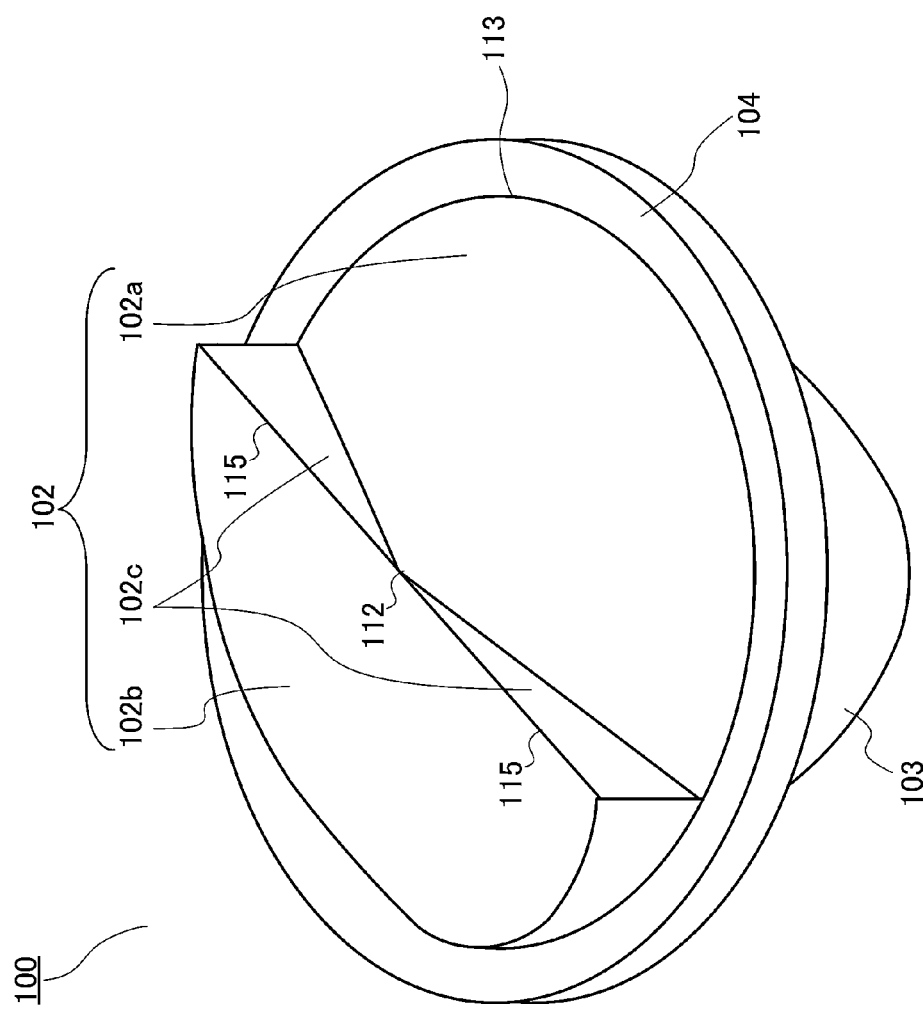
FIG. 2 is a perspective view of a light flux controlling member according to an embodiment of the invention.
Figure 3B:
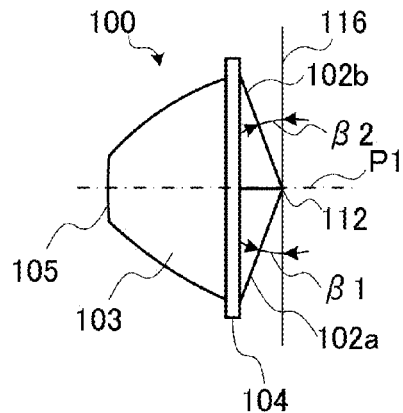
FIG. 3B is a side view of the light flux controlling member according to the embodiment of the invention.
Figure 3A:
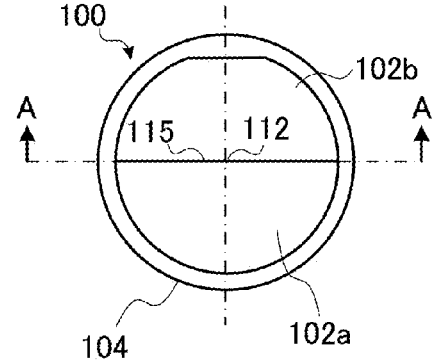
FIG. 3A is a plan view of the light flux controlling member according to the embodiment of the invention.
Figure 3C:
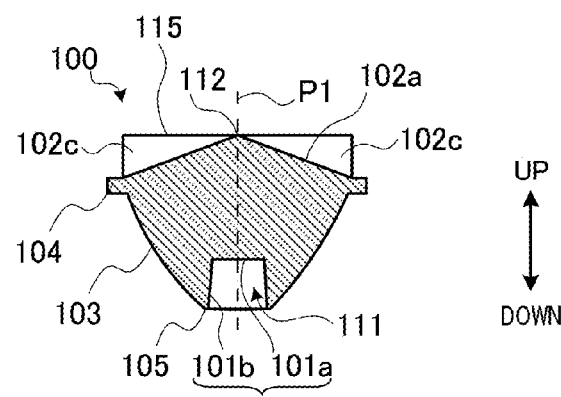
FIG. 3C is a cross-sectional view taken along line A-A of FIG. 3A.
Figure 3D:
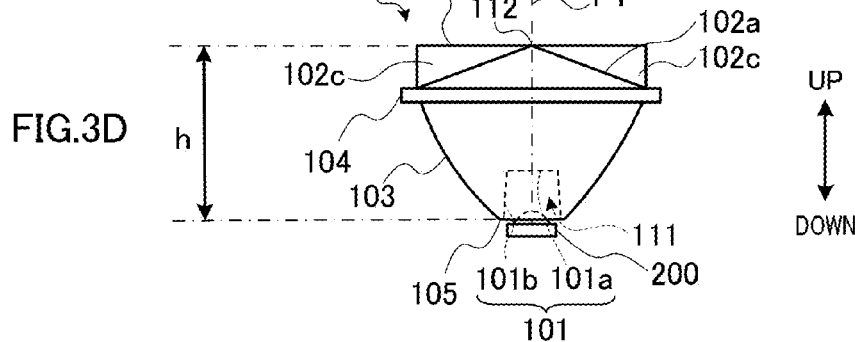
FIG. 3D is a front view of the light flux controlling member according to the embodiment of the invention.
Figure 3E:
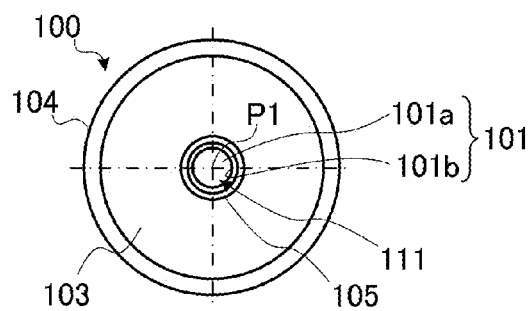
FIG. 3E is a bottom view of the light flux controlling member according to the embodiment of the invention.

Hereinafter, the configuration of lighting lens 100 as a light flux controlling member will be described in detail. FIG. 2 is a perspective view illustrating lighting lens 100 according to an embodiment of the invention. FIG. 3A is a plan view of lighting lens 100 according to the embodiment of the invention. FIG. 3B is a side view of lighting lens 100 according to the embodiment of the invention. FIG. 3C is a cross-sectional view taken along line A-A of FIG. 3A. FIG. 3D is a front view of lighting lens 100 according to the embodiment of the invention. FIG. 3E is a bottom view of lighting lens 100 according to the embodiment of the invention. FIG. 3D shows light emitting element 200 together.

Lighting lens 100 includes incidence surface part 101, emission surface part 102, total reflection surface part 103, flange 104, and bottom surface part 105.

Lighting lens 100 is formed of a transparent resin material such as polymethylmethacrylate (PMMA), polycarbonate (PC), or epoxy resin (EP) or a transparent glass. Lighting lens 100 is mounted on a board not shown and having light emitting element 200 fixed thereto so that central axis P1 matches the optical axis of light emitting element 200 such as a light emitting diode, thereby constituting a light emitting unit (see FIG. 3D). The lighting lens 100 has a circular planar shape.

Incidence surface part 101 is formed on the inner surface of concave part 111 which is formed by making bottom surface part 105 opposing light emitting element 200 concave inward, so as to have rotational symmetry around central axis P1. Incidence surface part 101 has first incidence surface part 101a which is an inner top surface of concave part 111 and second incidence surface part 101b which has a tapered cylindrical shape extending from first incidence surface part 101a to the opening edge of concave part 111. Here, the inner diameter of second incidence surface part 101b gradually increases from first incidence surface part 101a side to the opening edge so that the inner diameter of the opening edge is larger than the inner diameter of an end edge of first incidence surface part 101a side.

Emission surface part 102 has a circular shape when it is projected onto a plane. Emission surface part 102 includes a vertex 112 that is located at a predetermined height in a direction parallel to central axis P1 from the center of the circular shape projected onto a plane and that protrudes upward (illuminated surface side) from outer circumference 113, first emission surface part 102a that is inclined from vertex 112 to outer circumference 113 and that is curved to be convex upward, ridge 115 which is a straight line located at a predetermined height in the direction parallel to central axis P1 from the diameter of the circle projected onto a plane, second emission surface part 102b that is inclined from ridge 115 to outer circumference 113, and third emission surface part 102c that is formed between the diameter of the circle projected onto a plane and ridge 115 by a difference in level between first emission surface part 102a and second emission surface part 102b.

First emission surface part 102a is a semi-conical aspheric surface formed in the angle region of 180° around central axis P1 and has a semi-circular shape when it is projected onto a plane.

Second emission surface part 102b is an inclined surface that is formed so that an end forming ridge 115 is located at the same height as the vertex and the height (the height from the top surface of flange 104 in the direction parallel to central axis P1) gradually decreases in the direction perpendicular to ridge 115, and has a cylinder shape (a shape having curvature in the direction perpendicular to ridge 115 and not having curvature in the direction parallel to ridge 115) formed in the angle region of 180° around central axis P1. Second emission surface part 102b is not limited to the cylinder shape, but may be formed in such a toroidal shape (torus surface) that both a first intersection line of second emission surface part 102b and a cross-section including central axis P1 and a second intersection line of second emission surface part 102b and a cross-section perpendicular to central axis P1 curve. At this time, in the cross-section perpendicular to central axis P1 around vertex 112, it is preferable that the radius of curvature of the first intersection line is larger than the radius of curvature of the second intersection line.

Second emission surface part 102b has a semi-circular shape opposite to first emission surface part 102a projected onto a plane. Here, when second emission surface part 102b has a semi-conical shape, angle β2 formed by second emission surface part 102b and virtual plane 116 perpendicular to central axis P1 is larger than angle β1 formed by the generating line of first emission surface part 102a and virtual plane 116 perpendicular to central axis P1 (β2>β1) (see FIG. 3B).

A pair of third emission surface part 102c is formed and each has a line symmetric shape about central axis P1. The front shape of third emission surface part 102c has a triangular shape as shown in FIGS. 3C and 3D, and protrudes upward along central axis P1.

Total reflection surface part 103 is an outer surface extending from the outer circumference of bottom surface part 105 to the undersurface of flange 104, and is a rotational symmetric surface formed to surround central axis P1. The outer diameter of total reflection surface part 103 gradually increases from bottom surface part 105 to flange 104, and the generating line thereof has a convex circular arc curve on the outside (on the side apart from central axis P1).

Flange 104 protrudes outward in the diameter direction of emission surface part 102 and has a substantially ring shape.

Bottom surface part 105 is a ring-like plane formed around the opening edge of concave part 111.

Vertex 112 protrudes to be located on central axis P1 and comes in contact with first emission surface part 102a, second emission surface part 102b, and third emission surface part 102c.

Figure 4:
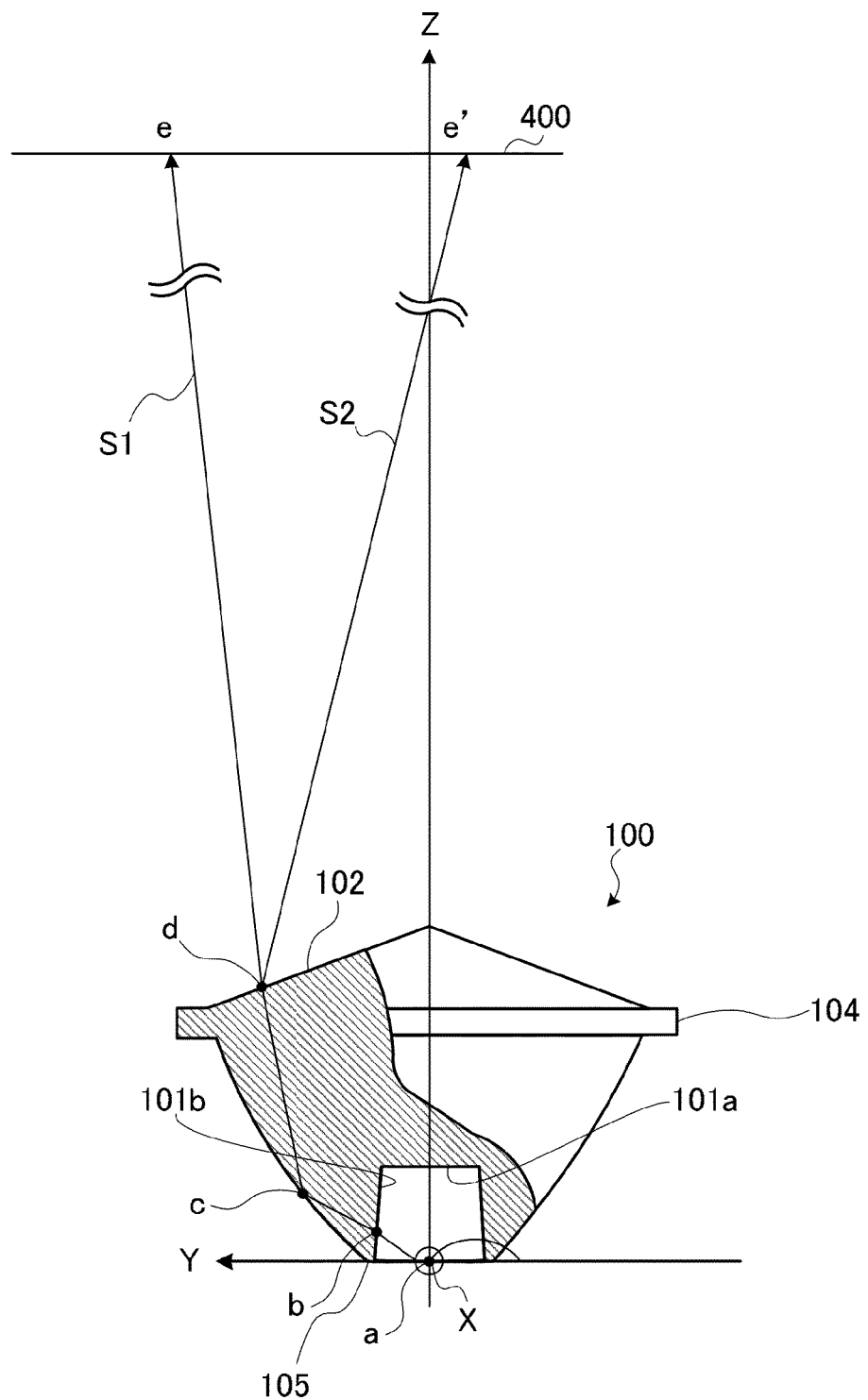
FIG. 4 is a diagram illustrating a path of emitted light from a light emitting unit when the light flux controlling member according to the embodiment of the invention is used.

FIG. 4 is a diagram illustrating light paths S1 and S2 when the light distribution characteristics are controlled by the use of lighting lens 100. In FIG. 4, the Y axis is an extension line of bottom surface part 105, the left side is defined as a + direction, and the right side is defined as a − direction. In FIG. 4, the Z axis is an optical axis of light emitting element 200 and the upper side is a + direction. In FIG. 4, the X axis is a straight line passing through an intersection point of the Y axis and the Z axis and perpendicular to the Y axis and the Z axis, the front side of the drawing surface is defined as a − direction, and the back side of the drawing surface is defined as a + direction. In FIG. 4, an intersection point of the X axis, the Y axis, and the Z axis is defined as origin a (coordinate (X, Y, Z)=(0.000, 0.000, 0.000)). In FIG. 4, measurement points e and e' are points on measurement plane 400 parallel to the X-Y plane and located apart by 200 mm in the Z axis direction from the X-Y plane. In FIG. 4, when first emission surface part 102a is located on the left side of optical axis Z, path S1 represents the path of light emitted from first emission surface part 102a. In FIG. 4, when second emission surface part 102b is located on the left side of optical axis Z, path S2 represents the path of light emitted from second emission surface part 102b.

In lighting lens 100 having the above-mentioned configuration, as shown in FIG. 4, light incident on first incidence surface part 101a out of light emitted from light emitting element 200 directly arrives at first emission surface part 102a and second emission surface part 102b, and light incident on second incidence surface part 101b is totally reflected by total reflection surface part 103, is concentrated, and arrives at first emission surface part 102a and second emission surface part 102b.

Light (light of path S1 in FIG. 4) illuminating an illuminated surface not shown is emitted from first emission surface part 102a.

Light (light of path S2 in FIG. 4) which is directed to an illuminated surface not shown and which can illuminate the illuminated surface while more spreading in the direction perpendicular to optical axis Z compared with light emitted from first emission surface part 102a is emitted from second emission surface part 102b. The light emitted from second emission surface part 102b is more greatly refracted to the opposite side of the light incidence side about optical axis Z, compared with light emitted from a conventional lighting lens or light emitted from first emission surface part 102a. Accordingly, it is possible to extensively illuminate the illuminated surface.

Light illuminating, in the direction perpendicular to central axis P1, an illuminated surface having the same height as height h (see FIG. 3D) from light emitting element 200 to third emission surface part 102c and the vicinity thereof is emitted from third emission surface part 102c (not shown in FIG. 4). That is, light is emitted from third emission surface part 102c toward a easily-shadowed region in a lighting device which uses a conventional light flux controlling member that controls light emitted from light emitting element 200 to have narrow light distribution characteristics.

FIG. 5 is a diagram illustrating positions of the path of light at the measurement points shown in FIG. 4 when the conventional lighting lens is used. FIG. 6 is a diagram illustrating positions of the path of light at the measurement points shown in FIG. 4 when lighting lens 100 according to this embodiment is used and first emission surface part 102a is disposed on the +side of the Y axis (the left region of origin a on the Y axis in FIG. 4). FIG. 7 is a diagram illustrating positions of the path of light at the measurement points shown in FIG. 4 when lighting lens 100 according to this embodiment is used and second emission surface part 102b is disposed on the + side of the Y axis.

The position (see FIG. 7) of measurement point e' of light emitted from second emission surface part 102b on the X axis and the Y axis is larger on the − side of the X axis (the back side of the drawing surface from origin a on the X axis in FIG. 4) and the − side of the Y axis (the right side from origin a on the Y axis in FIG. 4), compared with the position (see FIGS. 5 and 6) of measurement point e of light emitted from first emission surface part 102a on the X axis and the Y axis and the position in the conventional case.

(Configuration of Lighting Device)

Figure 8:
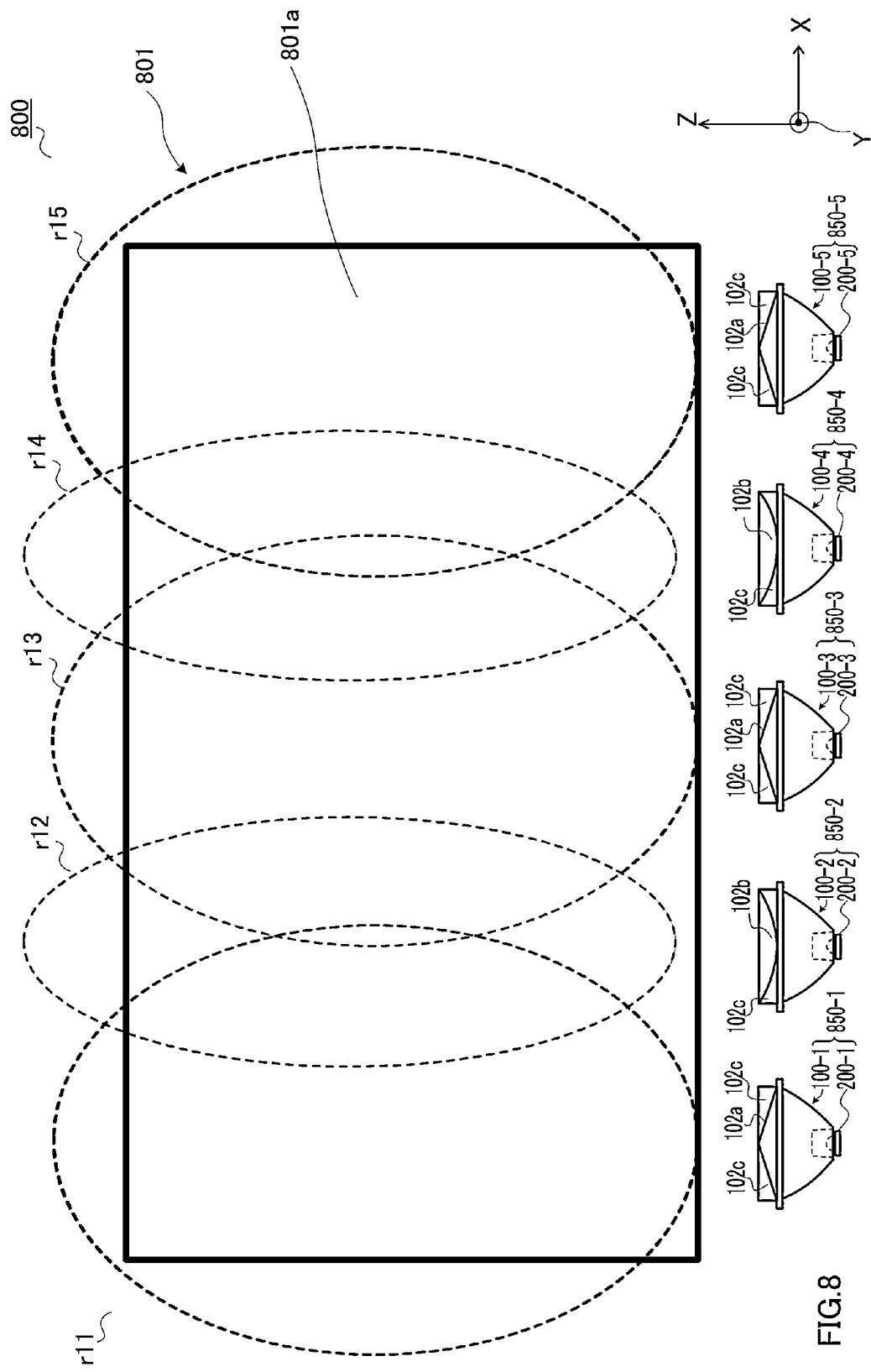
FIG. 8 is a front view of a lighting device according to the embodiment of the invention.
Figure 9:
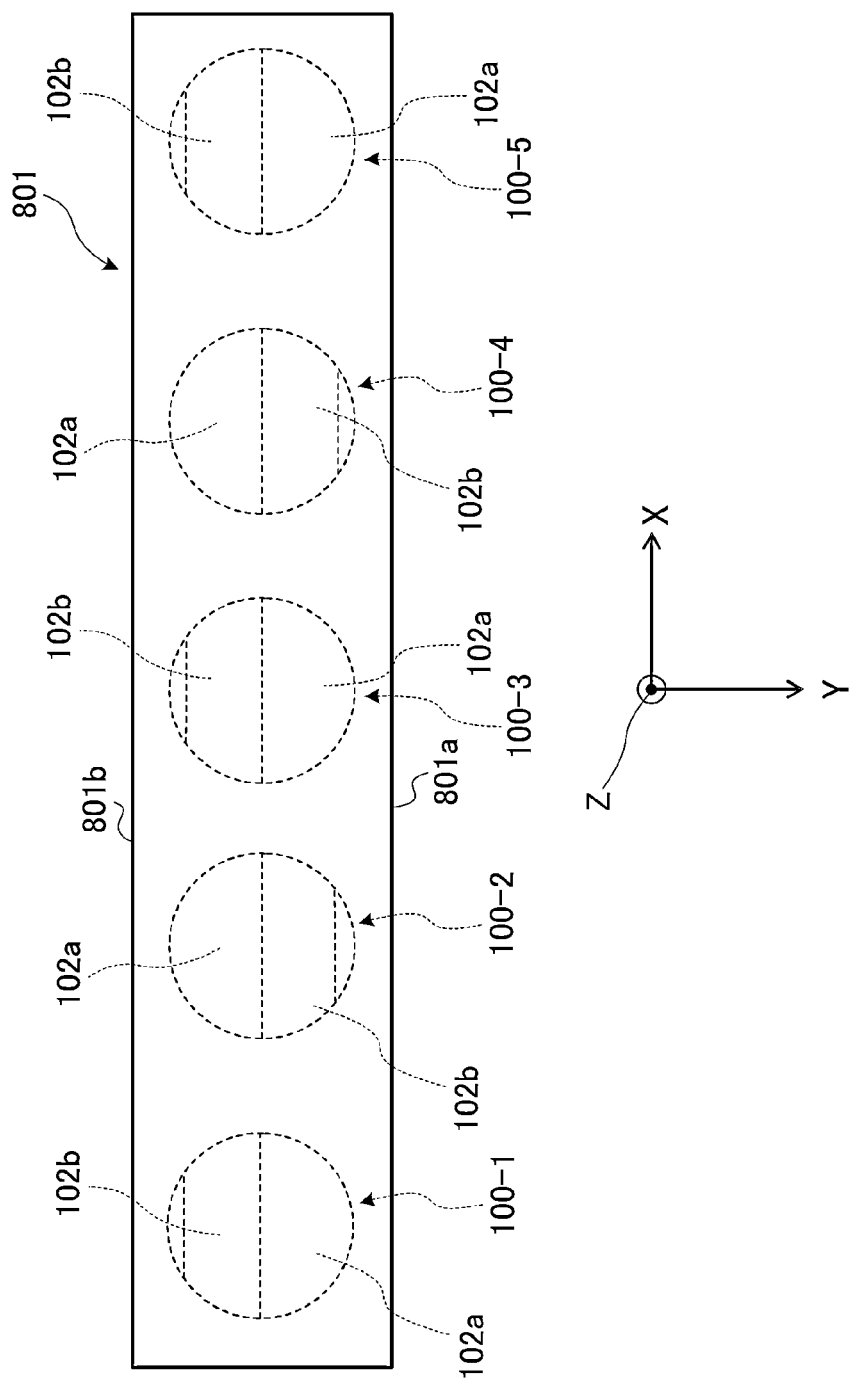
FIG. 9 is a plan view of the lighting device according to the embodiment of the invention.

Hereinafter, the configuration of lighting device 800 will be described in detail. FIG. 8 is a front view of lighting device 800 according to the embodiment of the invention. FIG. 9 is a plan view of lighting device 800 according to the embodiment of the invention. In FIGS. 8 and 9, lighting lenses 100-1 to 100-5 have the same configuration as shown in FIGS. 2 to 3E. In FIG. 8, illuminated regions r11 to r15 represent illuminated regions in illuminated surface 801a illuminated by light emitted from lighting lenses 100-1 to 100-5.

Lighting lenses 100-1 to 100-5 are arranged along the X axis of the X axis, the Y axis, and the Z axis which are perpendicular to each other, and illuminated surface 801 is arranged to be parallel to the XZ plane. The Z axis matches central axis P1 of lighting lens 100-3.

Illuminated surface 801a is a plane which is parallel to the XZ plane and which is apart, for example, by 40 mm on the + side of the Y axis (on the front side of the drawing surface from the intersection of Y axis and the Z axis on the Y axis in FIG. 8) from the XZ plane. Opposing illuminated surface 801b is a plane which is parallel to the XZ plane and which is apart, for example, by 40 mm on the − side of the Y axis (on the back side of the drawing surface from the intersection of Y axis and the Z axis on the Y axis in FIG. 8) from the XZ plane. The distance of illuminated surface 801a and illuminated surface 801b from the X-Y plane on the Y axis is not limited to the above-mentioned distance, but may be set to any value. The incident angle of light which illuminates illuminated surface 801a and opposing illuminated surface 801b arranged in this way decreases as it is emitted from lighting lenses 100-1 to 100-5 at a larger angle about central axis P1 (optical axis Z).

Lighting device 800 includes plural lighting lenses 100-1 to 100-5 having the configuration shown in FIGS. 2 to 3E, light emitting elements 200-1 to 200-5, and rectangular illuminating surface part 801. Light emitting units 850-1 to 850-5 are constituted by lighting lenses 100-1 to 100-5 and light emitting elements 200-1 to 200-5, respectively. Illuminated surface part 801 includes illuminated surface 801a and opposing illuminated surface 801b which is disposed to be parallel to illuminated surface 801a and oppose illuminated surface 801a. In lighting device 800, the number of lighting lenses 100-1 to 100-5 to be arranged is not limited to five, but an arbitrary number of lighting lenses 100-1 to 100-5 are arranged depending on the areas of illuminated surface 801a and opposing illuminated surface 801b.

Plural lighting lenses 100-1 to 100-5 are disposed at predetermined intervals along the length direction (the left-right direction in FIG. 8) of illuminated surface part 801 at positions opposing a virtual bottom surface part not shown in illuminated surface part 801. Lighting lenses 100-1 to 100-5 are arranged so that ridge 115 is parallel to the arrangement direction (the left-right direction in FIG. 8) of lighting lenses 100-1 to 100-5 and neighboring lighting lenses 100-1 to 100-5 are rotated by 180° on a plane perpendicular to the optical axis of lighting emitting elements 200. That is, lighting lenses 100-1 to 100-5 are arranged so that lighting lenses 100-1, 100-3, and 100-5 of which first emission surface part 102a is located on illuminated surface 801a side and lighting lenses 100-2 and 100-4 of which second emission surface part 102b is located on illuminated surface 801a side are adjacent to each other.

Specifically, arrangement (in which first emission surface part 102a is arranged toward the front side in FIG. 8) in which first emission surface part 102a opposes a first virtual plane when a virtual plane (hereinafter, referred to as "first virtual plane") obtained by extending illuminated surface 801a to the position opposing lighting lenses 100-1 to 100-5 is assumed, and arrangement (in which second emission surface part 102b is arranged toward the front side in FIG. 8) in which first emission surface part 102a opposes a second virtual plane when a virtual plane (hereinafter, referred to as "second virtual plane") obtained by extending opposing illuminated surface 801b to the position opposing lighting lenses 100-1 to 100-5 is assumed are alternately repeated. That is, lighting lenses 100-1, 100-3, and 100-5 are arranged so that first emission surface part 102a opposes the first virtual plane and second emission surface part 102b opposes the second virtual plane. Lighting lenses 100-2 and 100-4 are arranged so that first emission surface part 102a opposes the second virtual plane and second emission surface part 102b opposes the first virtual plane.

Illuminated surface 801a and opposing illuminated surface 801b have figures or characters of a signboard described thereon and are illuminated by light emitted from light emitting elements 200 via lighting lenses 100-1 to 100-5.

Figure 1:
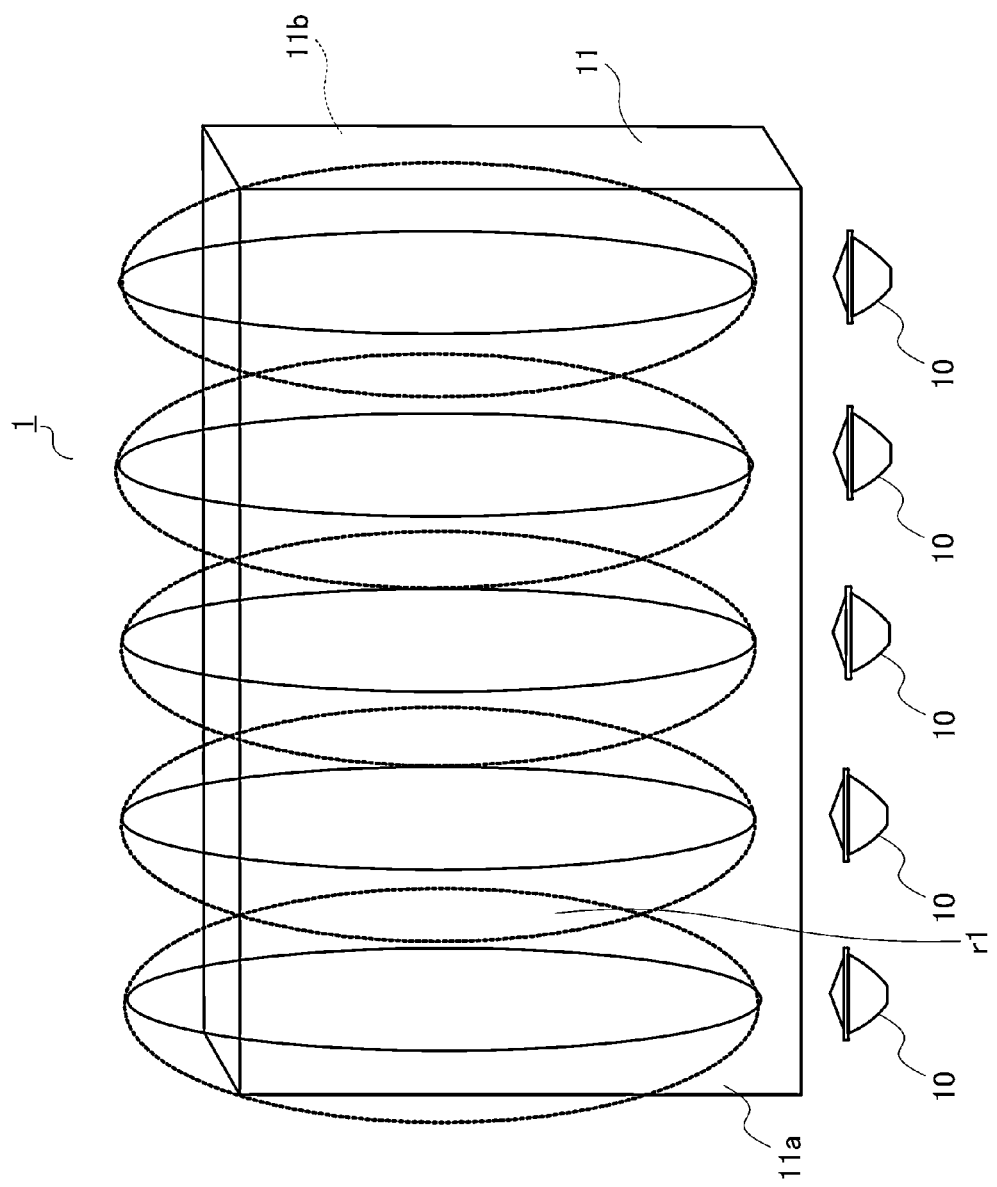
FIG. 1 is a diagram illustrating a lighting device using a lighting lens formed to be symmetric about the optical axis of a light emitting diode in PTL 2.

Lighting device 800 having the above-mentioned configuration can illuminate a broader area (area r11, area r13, and area r15) in illuminated surface 801a through the use of first emission surface parts 102a and second emission surface parts 102b of lighting lenses 100-1, 100-3, and 100-5, compared with a case where it is illuminated through the use of only first emission surface part 102a. Lighting device 800 can illuminate a broader area in opposing illuminated surface 801b through the use of first emission surface parts 102a and second emission surface parts 102b of lighting lenses 100-2 and 100-4, compared to a case where only first emission surface parts 102a illuminate illuminated surface 801b. Accordingly, it is possible to illuminate area r1 in FIG. 1 which could not be illuminated satisfactorily in the conventional art, and thus to prevent the irregularity in illuminance in illuminated surface 801a and opposing illuminated surface 801b.

Lighting device 800 can be slim border in illuminated surface 801a and opposing illuminated surface 801b by illuminating illuminated surface 801a and opposing illuminated surface 801b through the use of third emission surface part 102c. Here, "slim border" means decreasing a distance between a position where the illuminance of light emitted through lighting lens 100 from a light source is equal to or larger than a predetermined value and a position of the light source. In general, in a spotlight illuminating an optical axis direction by narrowing the light distribution characteristics of light emitted from a light emitting element, since the illuminated area is narrowed, the illuminance of the illuminated surface located at a position apart from the light emitting element can be raised, but the illuminance in the vicinity of the light emitting element is lowered to increase the border width. However, in this embodiment, since illuminated surface 801a and opposing illuminated surface 801b are illuminated by light emitted from third emission surface part 102c in addition to first emission surface part 102a and second emission surface part 102b, it is possible to decrease the border width. By decreasing the border width, it is possible to reduce frame parts of illuminated surface 801a and opposing illuminated surface 801b.

(Positional Relationship between Emission Surface Part and Illuminated Surface in Lighting Device)

Figure 10:
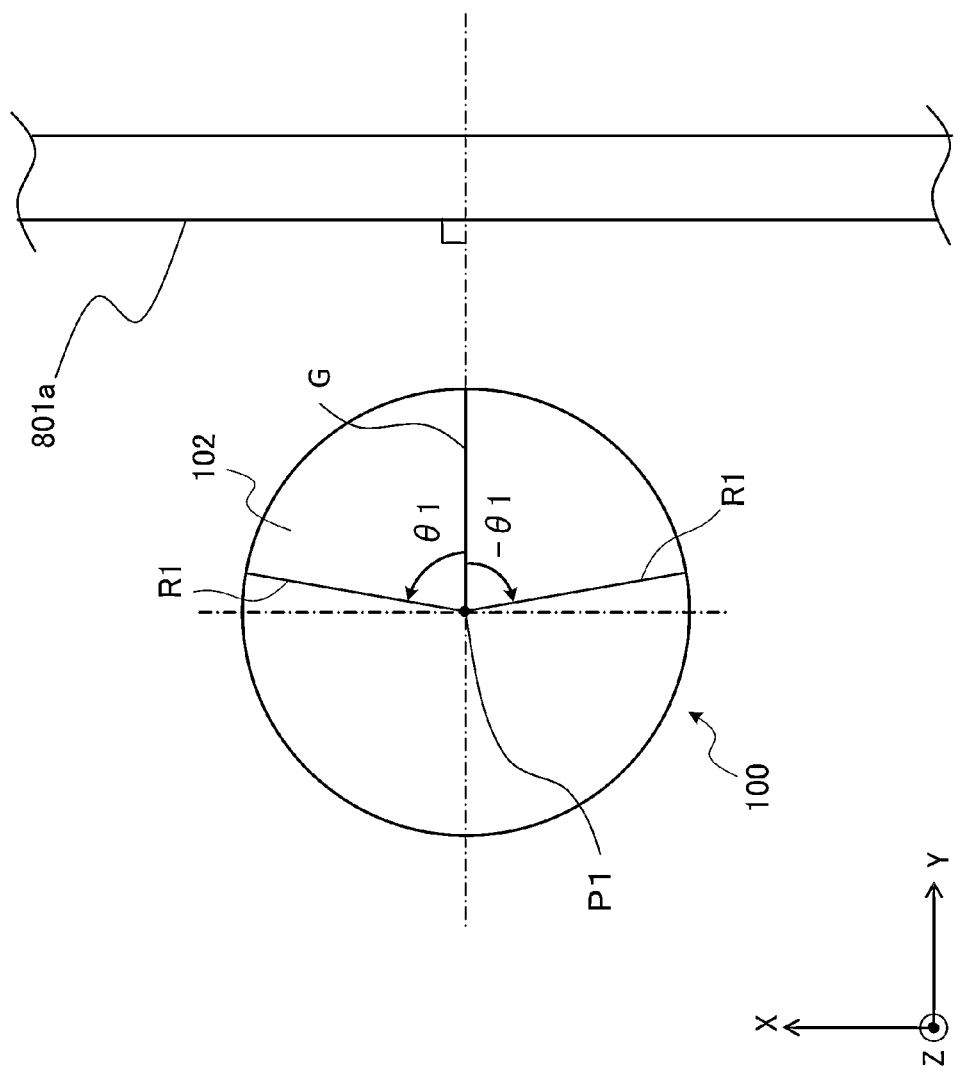
FIG. 10 is a plan view of an illuminated surface and an emission surface part in the embodiment of the invention.

Emission surface part 102 will be described below in correlation with illuminated surface part 801 with reference to FIG. 10. FIG. 10 is a plan view of an illuminated surface 801a and an emission surface part 102. The coordinate axes of the X axis, the Y axis, and the Z axis in FIG. 10 are matched with the coordinate axes of the X axis, the Y axis, and the Z axis in FIG. 8.

First emission surface part 102a is formed by using, as generating line G, an intersection line with cross-section D1 perpendicular to illuminated surface 801a and including central axis P1, and revolving generating line G about central axis P1. In the revolving region of generating line G at this time, angle $\theta$ about cross-section D1 perpendicular to illuminated surface 801a and including central axis P1 is in a range of $-\theta 1 \le \theta \le \theta 1$ (first angle region), where $\theta 1 = 90°$ is set in this embodiment. The revolving region of generating line G when forming first emission surface part 102a may be changed depending on the size of illuminated surface 801a or opposing illuminated surface 801b disposed to oppose it. FIG. 10 shows a case where the first angle region which is the revolving region of generating line G extending to the + side of the Y axis from central axis P1 is determined and first emission surface part 102a is formed to be located on illuminated surface 801a side, but this embodiment is not limited to this case. The first angle region of generating line G extending to the − side of the Y axis from central axis P1 may be determined and first emission surface part 102a may be formed to be located on opposing illuminated surface 801b side.

Second emission surface part 102b is formed in a region (second angle region) other than the first angle region when emission surface part 102 is viewed in a plan view. At this time, the second angle range is expressed by $\theta 1 \le \theta \le 180°$ and $-180° \le \theta \le -\theta 1$, where $\theta 1 = 90°$ is set in this embodiment. Second emission surface part 102b is formed so that the light flux emitted to illuminated surface part 801 on first emission surface part 102a side is more than that when first emission surface part 102a is formed in the range of $\theta 1 = 180°$ (the entire surface of emission surface part 102).

When the first angle region of generating line G extending to the + side of the Y axis from central axis P1 shown in FIG. 10 is determined and first emission surface part 102a is formed to be located on illuminated surface 801a, third emission surface part 102c formed by the difference in level between first emission surface part 102a and second emission surface part 102b protrudes upward to oppose illuminated surface 801a.

(Configuration of Holder)

Figure 11:
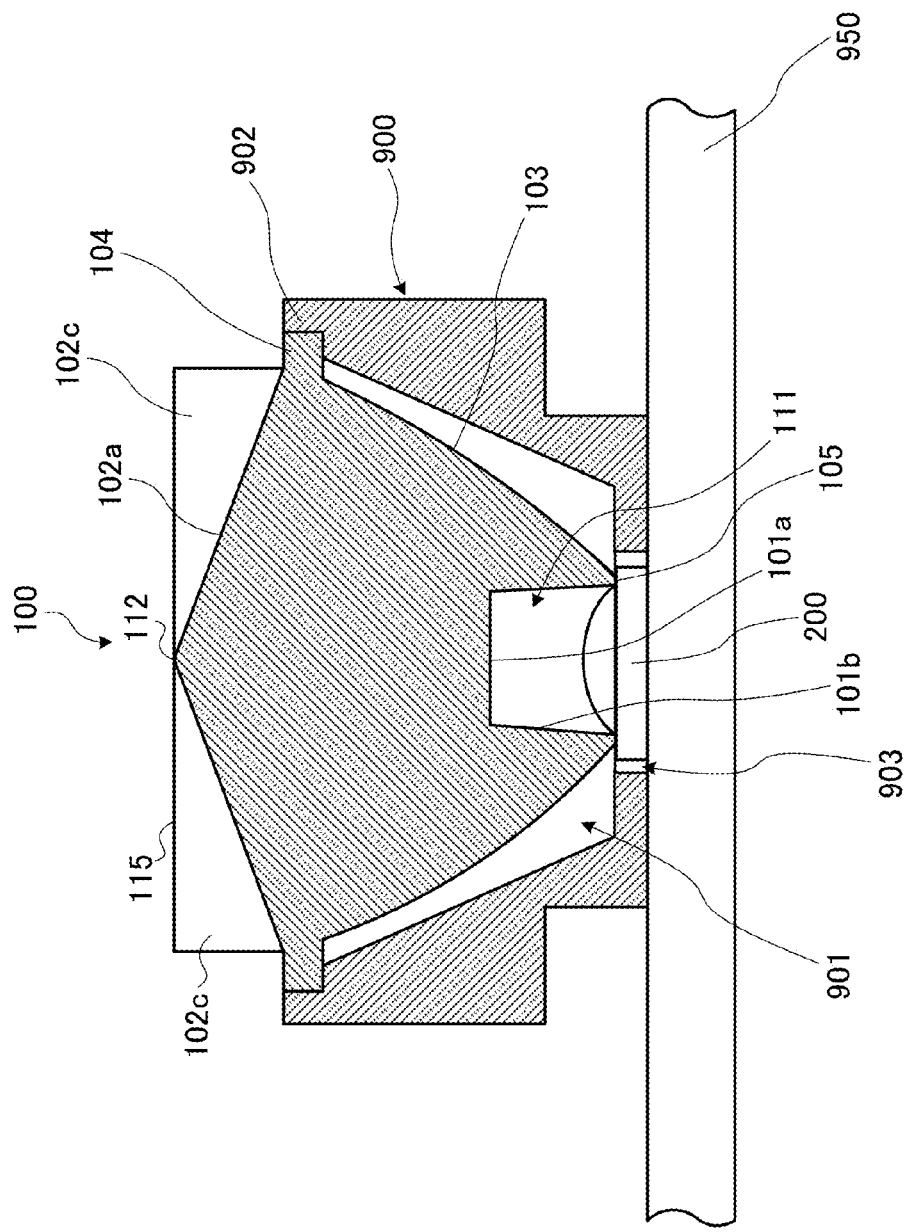
FIG. 11 is a side cross-sectional view of a holder receiving the light flux controlling member according to the embodiment of the invention.

The configuration of holder 900 will be described below in detail. FIG. 11 is a side cross-sectional view of holder 900 having lighting lens 100 received therein.

Holder 900 is transparent and includes receiving part 901 receiving lighting lens 100, opening edge 902, and through-hole 903.

Receiving part 901 is formed in a size capable of receiving the lower part of flange 104 of lighting lens 100.

Opening edge 902 is formed on the upper end of the inner wall of receiving part 901 so as to have a diameter larger than the inner diameter of receiving part 901. Opening edge 902 comes in contact with the lower end of flange 104 of lighting lens 100 to regulate the downward movement of lighting lens 100.

Through-hole 903 is formed to vertically penetrate the bottom of receiving part 901 to have a size capable of passing light emitting element 200.

Holder 900 having the above-mentioned configuration is mounted on board 950 along with light emitting element 200 and lighting lens 100. In this state, light emitted from light emitting element 200 is emitted upward in FIG. 11 through lighting lens 100, and is also emitted to the left and right sides in FIG. 11 through lighting lens 100 and transparent holder 900. Light incident on transparent holder 900 is light with low luminous intensity which is not incident on lighting lens 100 but becomes leak light and which is emitted from light emitting element 200 at a large angle about the optical axis Z of light emitting element 200. This light with low luminous intensity can be applied to a region (a region of illuminated surface 801a and opposing illuminated surface 801b close to light emitting element 200) with a small incident angle on illuminated surface 801a and opposing illuminated surface 801b through holder 900, thereby supplementing lack of light intensity in the region. Accordingly, it is possible to reduce the border width between a position at which light emitted from light emitting element 200 through lighting lens 100 and holder 900 has a predetermined illuminance value or more and a position of light emitting element 200. The comparison of transparent holder 900 in this embodiment with a black holder will be described later.

(Measurement Result in Lighting Device)

Figure 12:
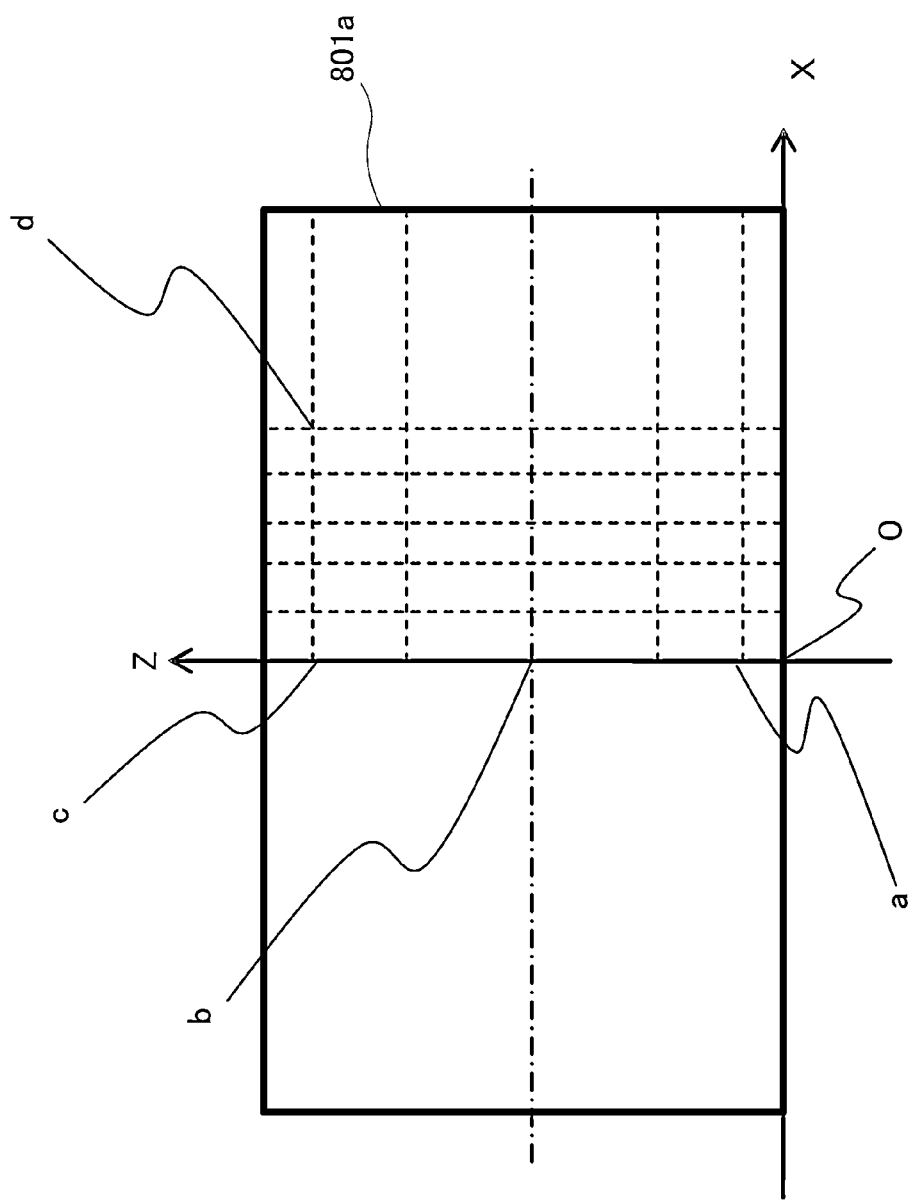
FIG. 12 is a diagram illustrating measurement points of illuminance in the illuminated surface of the lighting device according to the embodiment of the invention.

The measurement result of illuminance in lighting device 800 will be described below with reference to FIGS. 12 and 13. FIG. 12 is a diagram illustrating measurement points of illuminance in illuminated surface 801a of lighting device 800. FIG. 13 is a diagram illustrating the measurement result at the measurement points of illuminance in illuminated surface 801a and opposing illuminated surface 801b of lighting device 800, and the unit of illuminance is lux (lx). The coordinate axes of the X axis, the Y axis, and the Z axis shown in FIG. 12 are matched with the coordinate axes of the X axis, the Y axis, and the Z axis shown in FIGS. 8 and 9. In FIG. 12, the lower end of illuminated surface 801a is disposed on the X-Y plane and the optical axis of light emitting element 200 is set as the Z axis. The intersection point of the X-Y plane and the Z axis is set as origin O, and an axis perpendicular to the Z axis at origin O and parallel to illuminated surface 801a is set as the X axis. The measurement result of opposing illuminated surface 801b is substantially the same as the measurement result of illuminated surface 801a except for one pitch, and thus description thereof will not be made.

At the measurement points of FIG. 12, the illuminance of the illuminated surface when it is illuminated by only a light emitting element (hereinafter, referred to as "Case 1"), the illuminance of the illuminated surface when it is illuminated through the use of the conventional lighting lens (hereinafter, referred to as "Case 2"), the illuminance of illuminated surface 801a on first emission surface part 102a side when it is illuminated through the use of lighting lens 100 according to this embodiment (hereinafter, referred to as "Case 3"), and the illuminance of opposing illuminated surface 801b on second emission surface part 102b side in Case 3 are shown in FIG. 13. Here, FIG. 13 shows the results when only one light emitting element 200 disposed on the Z axis is turned on. The illuminated surface on first emission surface part 102a side means an illuminated surface on the first virtual plane opposing first emission surface part 102a.

It can be seen from FIG. 13 that the illuminance at a position on optical axis Z apart from the light emitting element in Case 2 is higher than that in Case 1 and the uniformity in illuminance on the Z axis is improved by the conventional lighting lens. However, in order to remove a dark part (a dark part (area r1 in FIG. 1) between pitches of light emitting elements 200 when plural light emitting elements 200 are turned on) shown in FIG. 1, it is necessary to improve the uniformity in illuminance in the X axis direction. It is apparent that the uniformity in illuminance in the X axis direction is improved by using lighting lens 100 according to this embodiment, from the fact that the illuminance at measurement point d apart from both optical axis Z and light emitting element 200 in Case 3 is higher than those in Case 1 and Case 2. Accordingly, in this embodiment, it can be said that the uniformity in illuminance in both the X axis direction and the Z axis direction is improved in comparison with the conventional case.

Specifically, at measurement point a, the illuminance of the illuminated surface on first emission surface part 102a side in Case 3 indicates an increase of 127% in comparison with Case 2, and the illuminance of the illuminated surface on second emission surface part 102b side in Case 3 indicates an increase of 146% in comparison with Case 2. At measurement point d, the illuminance of the illuminated surface on first emission surface part 102a side in Case 3 indicates an increase of 137% in comparison with Case 2, and the illuminance of the illuminated surface on second emission surface part 102b side in Case 3 indicates an increase of 141% in comparison with Case 2.

Figure 14:
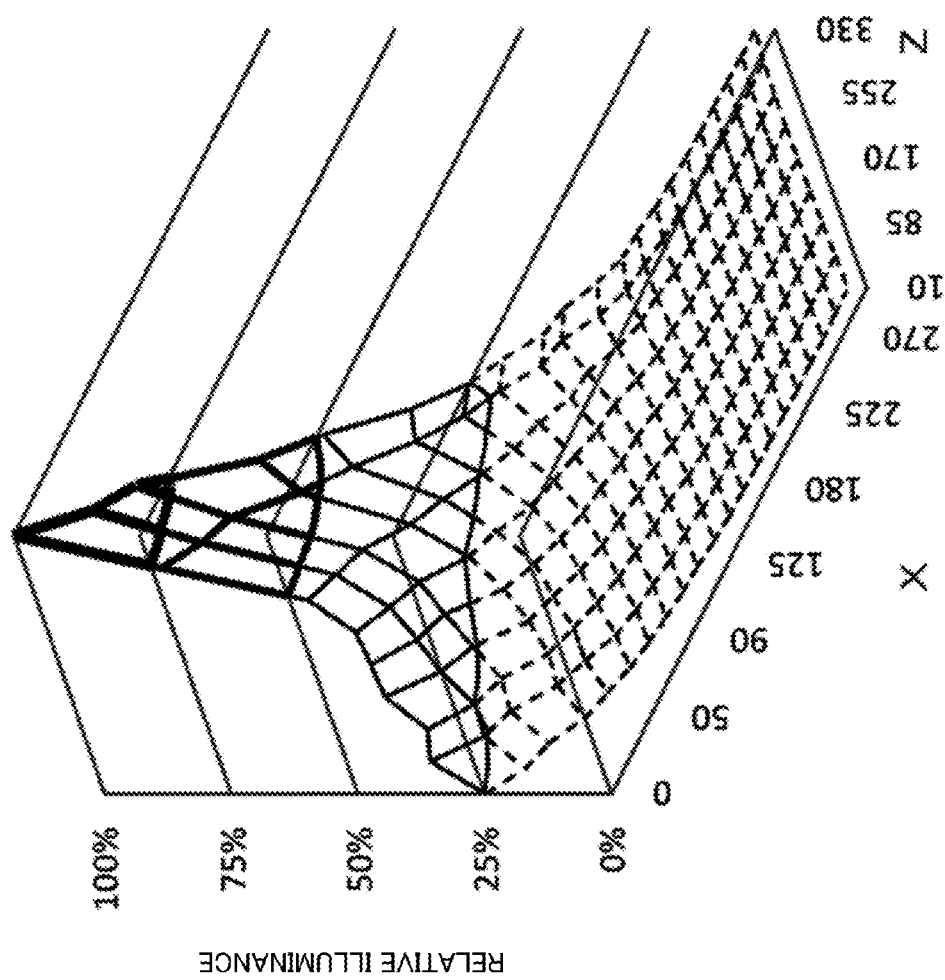
FIG. 14 is a diagram illustrating relative illuminance when the conventional lighting lens is used.
Figure 15:
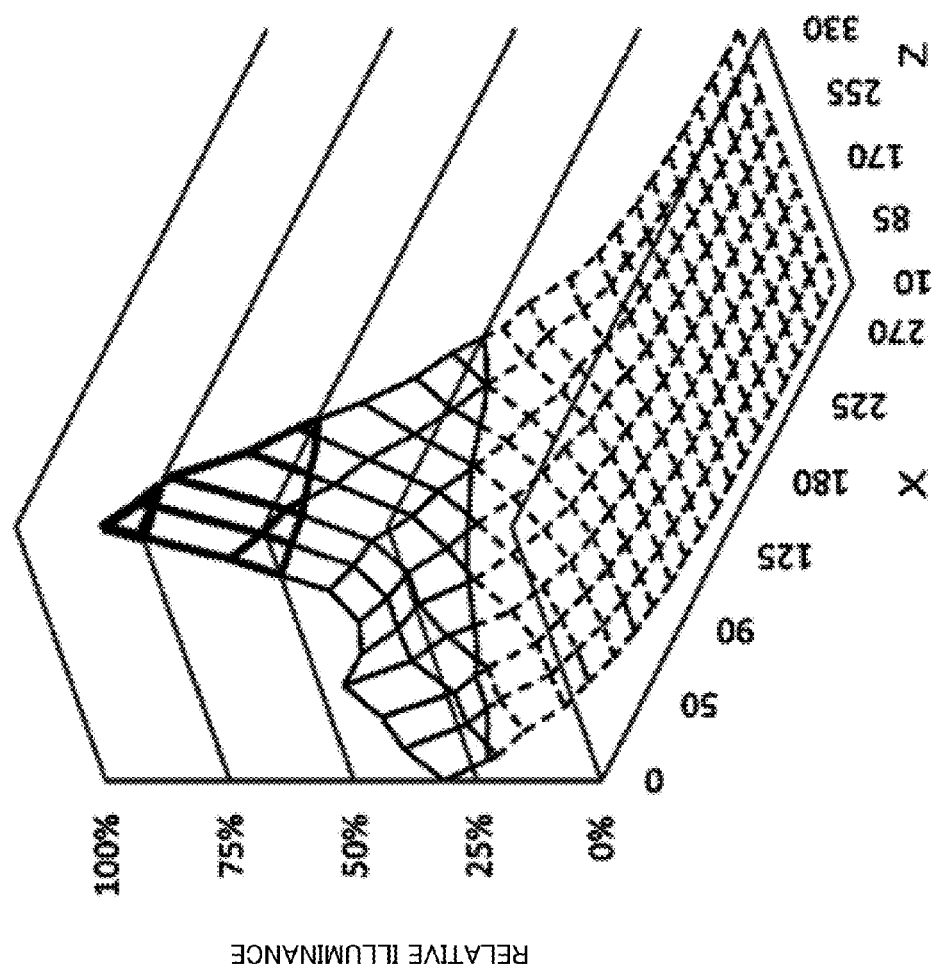
FIG. 15 is a diagram illustrating relative illuminance of the illuminated surface on the first emission surface part side when the lighting lens according to the embodiment of the invention is used.
Figure 16:
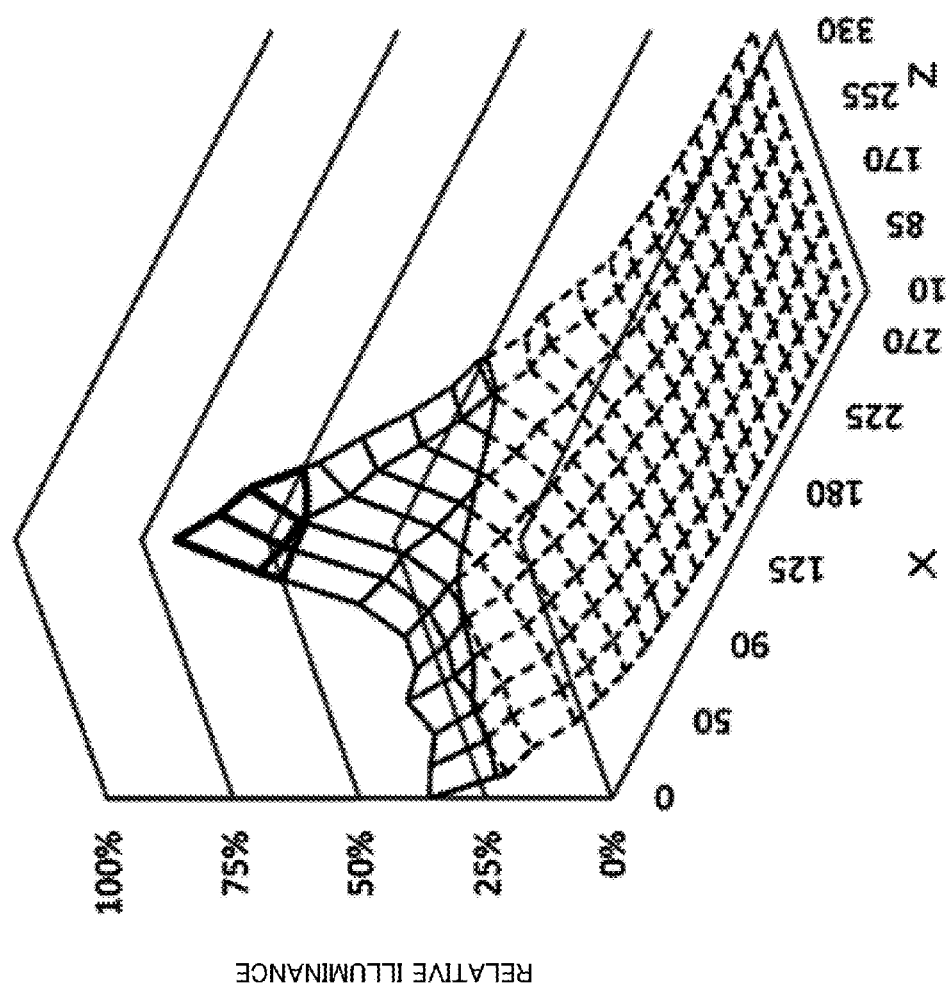
FIG. 16 is a diagram illustrating the relative illuminance of the opposing illuminated surface on the second emission surface part side when the lighting lens according to the embodiment of the invention is used.

The measurement result of illuminance in lighting device 800 will be described below in more detail with reference to FIGS. 14 to 16. FIG. 14 is a diagram illustrating the relative illuminance when a conventional lighting lens is used. FIG. 15 is a diagram illustrating the relative illuminance of illuminated surface 801a on first emission surface part 102a side when lighting lens 100 according to this embodiment is used. FIG. 16 is a diagram illustrating the relative illuminance of opposing illuminated surface 801b on second emission surface part 102b side when lighting lens 100 according to this embodiment is used. In FIGS. 14 to 16, the relative illuminance means a ratio when the maximum value of illuminance in the case of FIG. 14 where the conventional lighting lens is used is set to 100%. In FIGS. 14 to 16, the X axis and the Z axis are the same as shown in FIG. 12 and description thereof will not be repeated.

As shown in FIG. 14, conventionally, a region (part indicated by bold lines in FIG. 14) in which the relative illuminance is equal to or higher than 25% is concentrated on a narrow range of coordinates 0 to about 65 on the X axis. On the other hand, in this embodiment shown in FIGS. 15 and 16, the maximum value of the relative illuminance is lower than the conventional one, but the region (part indicated by bold lines in FIGS. 15 and 16) in which the relative illuminance is equal to or higher than 25% is in an extensive range of coordinates 0 to about 75 on the X axis. In this embodiment, the fact that the maximum value of the relative illuminance is lower than the conventional one means that the conventional excessive illuminance is lowered and an extensive area is illuminated by as much, and does not cause a marked decrease in illuminance in the illuminated surface and the opposing illuminated surface.

(Measurement Result in Holder)

Figure 17:
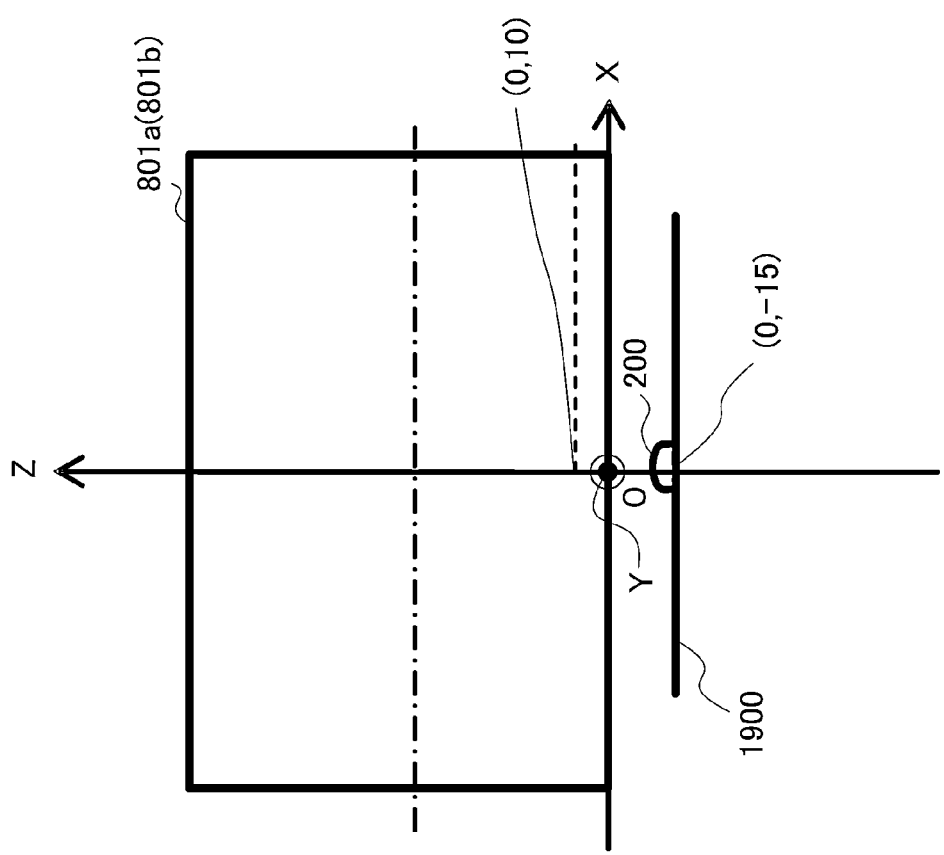
FIG. 17 is a diagram illustrating the relationship between the illuminated surface (the opposing illuminated surface) and the X and Z axes in the embodiment of the invention.

The measurement result of illuminance when transparent holder 900 shown in FIG. 11 is used will be described below with reference to FIGS. 17 to 19. FIG. 17 is a diagram illustrating the relationship between illuminated surface 801a (opposing illuminated surface 801b) and the X and Z axes. FIG. 18 is a diagram illustrating an illuminance increase rate in illuminated surface 801a on first emission surface part 102a side, compared with the case where a conventional black holder is used. FIG. 19 is a diagram illustrating an illuminance increase rate in opposing illuminated surface 801b on second emission surface part 102b side, compared with the case where a conventional black holder is used. In FIG. 17, the bottom edge of illuminated surface 801a is disposed on the X-Y plane of the X axis, the Y axis, and the Z axis three-dimensionally perpendicular to each other. In FIG. 17, the Z axis is an optical axis of light emitting element 200. The intersection of the X-Y plane and the Z axis is set as an origin of a coordinate (0, 0, 0). The light emission center of light emitting element 200 is set to a coordinate (0, 0, −15). Illuminated surface 801a and opposing illuminated surface 801b are arranged to be symmetric about the XZ plane. In this embodiment, illuminated surface 801a is a plane parallel to the XZ plane and apart by 40 mm to the + side of the Y axis from the XZ plane. Opposing illuminated surface 801b is a plane parallel to the XZ plane and apart by 40 mm to the − side of the Y axis from the XZ plane.

As shown in FIGS. 17 to 19, the illuminance increases in the Z axis coordinate range of 0 to 170 around light emitting element 200 mounted on board 1900, in comparison with the conventional one.

In the conventional case using a black holder, the overall periphery of light emitting element 200 is dark and a bright line (a line indicated by a dotted line in FIG. 17) is generated in the vicinity of a position at which light emitted from lighting lens 100 starts contact with illuminated surface 801a (opposing illuminated surface 801b). In this case, since the contrast between a region in which the illumination light intensity is small and a region in which light emitted from lighting lens 100 starts contact with illuminated surface 801a (opposing illuminated surface 801b) is strong, the bright line is remarkable. On the contrary, when holder 900 is formed of a transparent material as in this embodiment, the illuminance around light emitting element 200 can be raised and thus the contrast is weakened, thereby making it difficult to recognize the bright line. Therefore, since the bright line is hardly recognized, this region can be used as a display region and it is thus possible to narrow the frame in the illuminated surface.

(Advantage of This Embodiment)

According to this embodiment, it is possible to extensively broaden light emitted from the emission surface part and to suppress occurrence of irregularity in illuminance in an illuminated surface located at a predetermined position by arranging plural light flux controlling members, which distribute and emit incident light to the illuminated surface with good balance, in a predetermined direction in combination with light emitting elements.

According to this embodiment, by causing a part of incident light emitted from the light emitting element from the third emission surface part which is a wall surface parallel to the optical axis, it is possible to reduce the border width and to narrow the frame in the illuminated surface. Therefore, it is possible to raise the degree of freedom of a space in which figures or characters are described in the illuminated surface.

According to this embodiment, by forming the holder, which receives a lighting lens, out of a transparent material, light illuminating the illuminated surface in the vicinity of the light emitting unit can be emitted from the light emitting unit used in the lighting device according to the invention.

Accordingly, it is possible to reduce the border width even when the lighting lens is received in the holder.

According to this embodiment, by illuminating the illuminated surface through the use of a transparent holder, the contrast of the illuminated surface can be weakened. Accordingly, it is possible to narrow the frame part in the illuminated surface and to raise the degree of freedom of a space in which figures or characters are described in the illuminated surface.

In the above-mentioned embodiment, the illuminated surface and the opposing illuminated surface which oppose each other are illuminated by a light emitting unit. However, the invention is not limited to this configuration, but one illuminated surface may be illuminated by the light emitting unit. In this case, all the lighting lenses are arranged so that the first emission surface parts are located on the illuminated surface side illuminated by the light emitting unit. By providing a reflecting plate to the opposing illuminated surface opposed to the illuminated surface to be illuminated, it is possible to raise the illuminance of the illuminated surface. In the above-mentioned embodiment, the lighting lens is received in the holder and is then mounted on the board. However, the invention is not limited to this configuration, but the lighting lens may be mounted directly on the board.

Regarding the directions of the emission surface parts of the lighting lenses with respect to the illuminated surface, it has been stated that the first emission surface part and the second emission surface part are alternately arranged. However, the invention is not limited to this configuration, but the first emission surface parts of all the lighting lenses may be arranged to face the illuminated surface. By arranging the first emission surface parts of all the lighting lenses to face the opposing illuminated surface provided with a reflecting plate, the illuminated surface can be illuminated by the use of light directly emitted from the lighting lenses and reflected light from the reflecting plate.

The disclosure of Japanese Patent Application No. 2010-159852, filed on Jul. 14, 2010, including the specification, drawings, and abstract, are incorporated herein by reference in its entirety.

INDUSTRIAL APPLICABILITY

The lighting device according to the invention is suitable for controlling the light distribution characteristics of light emitted from a light emitting element.

REFERENCE SIGNS LIST

100-1 to 100-5 Lighting lens
102*a* First emission surface part
102*b* Second emission surface part
102*c* Third emission surface part
200-1 to 200-5 Light emitting element
850-1 to 850-5 Light emitting unit
800 Lighting device
801 Illuminated surface part
801*a* Illuminated surface

The invention claimed is:

1. A lighting device comprising:
a plurality of light emitting units that each include a light emitting element and a light flux controlling member that controls a traveling direction of light emitted from the light emitting element, and that are arranged at predetermined intervals;
an illuminated surface part that is illuminated by light emitted from the light flux controlling member; and
an opposing illuminated surface part that is disposed to oppose the illuminated surface part, wherein:
each of the plurality of light emitting units has the light flux controlling member and the light emitting element arranged so that a central axis of the light flux controlling member matches the optical axis of the light emitting element;
the illuminated surface part is disposed so that an incident angle of light, which is emitted with a larger angle about the optical axis out of light emitted from the light flux controlling member, on the illuminated surface part becomes smaller;
the light flux controlling member includes
an incidence part on which light emitted from the light emitting element is incident,
a total reflection surface part that totally reflects a part of light incident from the incidence part, and
an emission surface part that controls light reflected by the total reflection surface part and light directly arriving from the incidence part into light having desired light distribution characteristics and that emits the controlled light;
the incidence part includes a first incidence surface part that is formed on an inner top surface of a concave part formed by making a bottom surface of the light flux controlling member opposing the light emitting element concave inward and a second incidence surface part that is located between an outer rim of the first incidence surface part and an opening edge of the concave part;
the total reflection surface part is formed between the bottom surface and the emission surface part so as to surround the optical axis and totally reflects light mainly incident from the second incidence surface part of the incidence part toward the emission surface part; and
the emission surface part includes
a first emission surface part that is a surface formed by rotating a generating line, which is an intersection line with a cross-section perpendicular to the illuminated surface part and including the central axis, about the central axis in a first angle region ($-\theta 1 \leq \theta \leq \theta 1$) of an angle $\theta$ of the generating line with respect to the cross-section,
a second emission surface part that is formed in a second angle region ($\theta 1 \leq \theta \leq 180°$ and $-180° \leq \theta \leq -\theta 1$) of the angle $\theta$ so that a light flux emitted to one of the illuminated surface part and the opposing illuminated surface part close to the first emission surface part is greater than that in a case where the first emission surface part is formed in the entire angle region) ($0° \leq \theta < 360°$) of the angle $\theta$ in the emission surface part, and
a third emission surface part that is formed by a difference in level between the first emission surface part and the second emission surface part.

2. The lighting device according to claim 1, wherein the second emission surface part is formed so that the difference in level increases from the central axis to an end of the second emission surface part.

3. The lighting device according to claim 1, wherein the $\theta 1$ is 90°.

4. The lighting device according to claim 1, wherein one of the illuminated surface part and the opposing illuminated surface part is a light transmitting surface and the other is a light reflecting surface.

5. The lighting device according to claim 1, wherein the light emitting unit in which the first emission surface part is located on a side of the illuminated surface part and the light emitting unit in which the second emission surface part is located on the side of the illuminated surface part are arranged to be adjacent to each other.

6. The lighting device according to claim 1, wherein the plurality of light emitting units are all arranged so that the first emission surface part is located on a side of the illuminated surface part or the opposing illuminated surface part.

7. The lighting device according to claim 1, further comprising a transparent holder that receives the light flux controlling member.

* * * * *